United States Patent
Weber et al.

(10) Patent No.: US 8,856,439 B2
(45) Date of Patent: Oct. 7, 2014

(54) METHOD AND DEVICE FOR UTILIZING APPLICATION-LEVEL PRIOR KNOWLEDGE FOR SELECTIVELY STORING DATA IN HIGHER PERFORMANCE MEDIA

(75) Inventors: Bret S. Weber, Wichita, KS (US); Jeremy Pinson, Escondido, CA (US); Mark Nossokoff, Fort Collins, CO (US); Brian McKean, Longmont, CO (US)

(73) Assignee: LSI Corporation, San Jose, CA (US)

( * ) Notice: Subject to any disclaimer, the term of this patent is extended or adjusted under 35 U.S.C. 154(b) by 658 days.

(21) Appl. No.: 12/960,214

(22) Filed: Dec. 3, 2010

(65) Prior Publication Data

US 2012/0144111 A1    Jun. 7, 2012

(51) Int. Cl.
*G06F 12/00* (2006.01)
*G06F 3/06* (2006.01)
*G06F 12/12* (2006.01)
*G06F 13/18* (2006.01)

(52) U.S. Cl.
CPC ............. *G06F 12/00* (2013.01); *G06F 3/0689* (2013.01); *G06F 12/126* (2013.01); *G06F 13/18* (2013.01)
USPC ........... 711/114; 711/100; 711/111; 711/151; 711/154; 711/158

(58) Field of Classification Search
USPC .......................... 711/100, 111, 114, 154, 158
See application file for complete search history.

(56) References Cited

U.S. PATENT DOCUMENTS

| | | | |
|---|---|---|---|
| 6,775,745 B1 | 8/2004 | Fry et al. | |
| 2008/0104343 A1* | 5/2008 | Miyagaki et al. | 711/158 |
| 2008/0147974 A1 | 6/2008 | Madison et al. | |
| 2009/0083492 A1 | 3/2009 | Buyuktosunoglu et al. | |

OTHER PUBLICATIONS

Lu, Guanlin, et al., "Multi-level Exclusive Caching for Solid State Storage Device," Mar. 3, 2009, University of Minnesota, 32 pages.

* cited by examiner

*Primary Examiner* — Midys Rojas
(74) *Attorney, Agent, or Firm* — Suiter Swantz pc llo

(57) ABSTRACT

A method for selectively storing data identified by a software application in higher performance media may include executing control programming for an operating system and a software application hosted by the operating system. The software application assigns a first importance level to a first portion of data and a second importance level to a second portion of data. A first portion of data having the first importance level assigned by the software application is stored in a first storage medium at the instruction of the operating system. A second portion of data having the second importance level assigned by the software application is stored in a second storage medium at the instruction of the operating system. The second storage medium has at least one performance, reliability, or security characteristic different from the first storage medium.

20 Claims, 4 Drawing Sheets

METHOD AND DEVICE FOR UTILIZING APPLICATION-LEVEL PRIOR KNOWLEDGE FOR SELECTIVELY STORING DATA IN HIGHER PERFORMANCE MEDIA

TECHNICAL FIELD

The present disclosure generally relates to the field of computing systems and more particularly to a device, method, and system for utilizing application-level prior knowledge for selectively storing data in higher performance media.

BACKGROUND

Solid state storage in the form of flash based Solid State Drives (SSD) and solid state Peripheral Component Interconnect Express (PCIe) cards may provide higher performance than Hard Disk Drives (HDD), but may have a higher financial cost per unit of stored data. Similarly, high performance hard drives are typically more expensive per unit of stored data than high capacity hard drives. The performance of some applications may be improved if certain portions of data are stored in media having lower latency and providing faster access. For instance, in applications utilized for data mining, index information may be stored in fixed locations within specific storage volumes.

One way to accelerate access to data in a storage system is to utilize a cache. One type of cache stores frequently utilized data in Dynamic Random Access Memory (DRAM) in order to provide higher performance for data accesses. However, little distinction is made between different types of data, and most data passing through the system is cached. Because important data is processed along with less important data, important data is frequently cycled out of the cache. Further, because DRAM cache is expensive, only small amounts of data may be cached.

SUMMARY

A device may include an application server configured for executing control programming for an operating system and a software application hosted by the operating system. The software application assigns a first importance level to a first portion of data and a second importance level to a second portion of data. The device may also include a storage control module coupled with the application server for storing the first portion of data and the second portion of data at the instruction of the operating system. The device may further include a first storage medium coupled with the storage control module for storing the first portion of data having the first importance level assigned by the software application. The device may also include a second storage medium coupled with the storage control module for storing the second portion of data having the second importance level assigned by the software application. The second storage medium has at least one performance, reliability, or security characteristic different from the first storage medium.

A method for selectively storing data identified by a software application in higher performance media may include executing control programming for an operating system and a software application hosted by the operating system. The software application assigns a first importance level to a first portion of data and a second importance level to a second portion of data. Next, the method may include storing the first portion of data having the first importance level assigned by the software application in a first storage medium at the instruction of the operating system. Then, the method may include storing the second portion of data having the second importance level assigned by the software application in a second storage medium at the instruction of the operating system. The second storage medium has at least one performance, reliability, or security characteristic different from the first storage medium.

A system may include an application server configured for executing control programming for an operating system and a software application hosted by the operating system. The software application assigns a first importance level to a first portion of data and a second importance level to a second portion of data. The system may also include a storage network for coupling with the application server. The storage network may include a storage control module for storing the first portion of data and the second portion of data at the instruction of the operating system. The storage network may also include a first storage medium coupled with the storage control module for storing the first portion of data having the first importance level assigned by the software application. The storage network may further include a second storage medium coupled with the storage control module for storing the second portion of data having the second importance level assigned by the software application. The second storage medium has at least one performance, reliability, or security characteristic different from the first storage medium.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Figure 1:
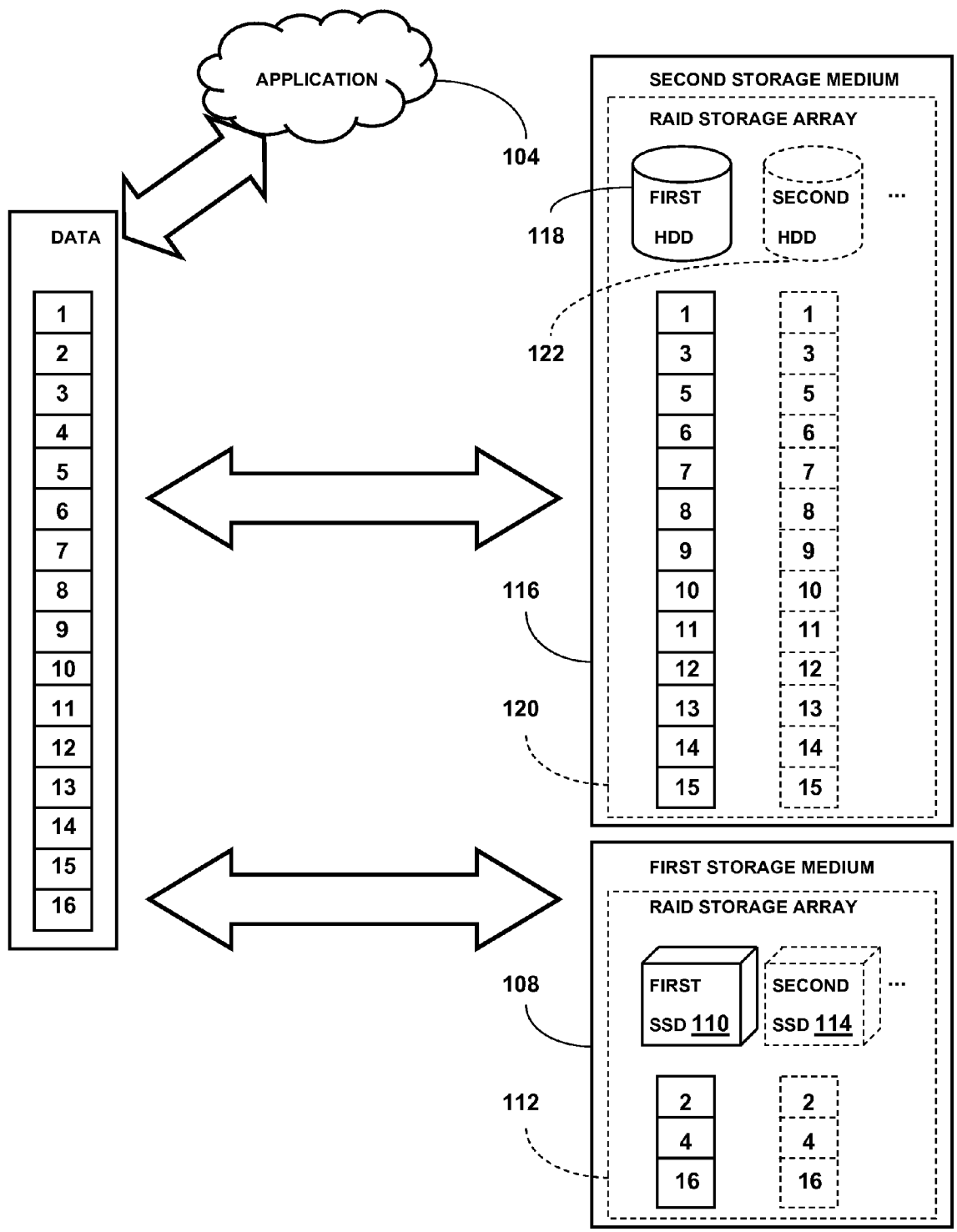
FIG. 1 is a schematic illustrating an external view of data for a software application and an internal view of the data as stored by a first storage medium and a second storage medium.
Figure 2:
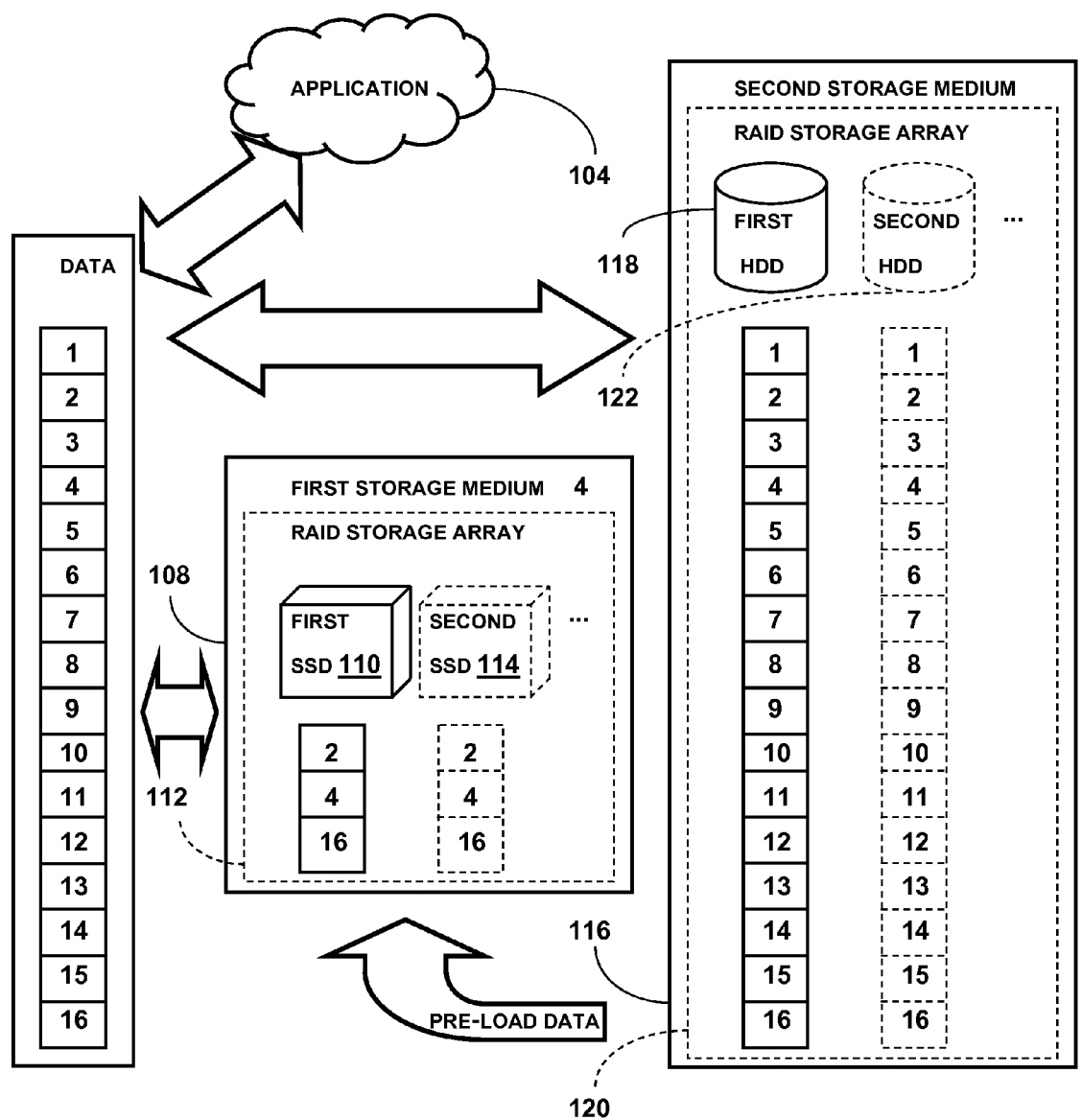
FIG. 2 is another schematic illustrating an external view of data for a software application and an internal view of the data as stored by a first storage medium and a second storage medium.
Figure 3:
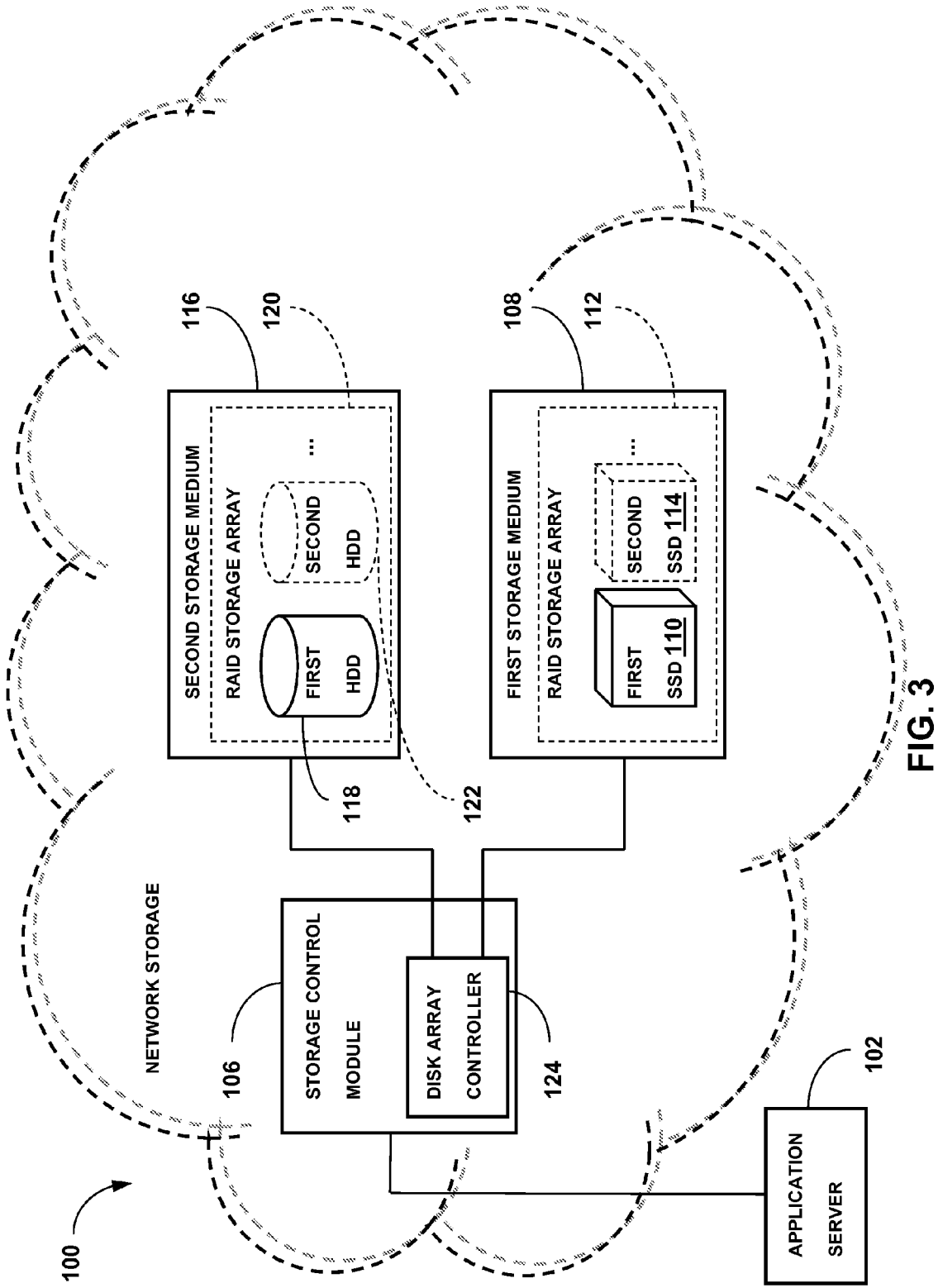
FIG. 3 is a schematic illustrating an information handling system for selectively storing data identified by a software application in higher performance media.

Referring generally to FIGS. 1 through 3, an information handling system 100 is described in accordance with the present disclosure. The information handling system 100 includes an application server 102 (e.g., a specialized server in a client/server network for executing specific applications within that network, a Central Processing Unit (CPU) included with a personal computer, or the like). The application server 102 is configured for executing control programming for an operating system and a software application 104 hosted by the operating system. In embodiments, the operating system may be implemented as an interface between computer hardware and one or more users. For example, the operating system may be responsible for managing and coordinating activities and resource sharing on a computer. Thus, the operating system may act as a host for one or more computing applications executed on the computer, such as the software application 104.

The application server 102 is coupled with a storage control module 106. The storage control module 106 is coupled with a first storage medium 108 (e.g., a non-volatile flash memory storage medium such as a Solid State Drive (SSD) 110, a Peripheral Component Interconnect Express (PCIe) card, a high performance Hard Disk Drive (HDD), or the like) for storing data in the first storage medium 108 at the instruction of the operating system. In embodiments, the first storage medium 108 may include a Redundant Array of Independent Disks (RAID) storage array 112, such as an array including the first SSD 110 and a second SSD 114 (and possibly additional drives as well). In one example configuration, the RAID storage array 112 may be arranged in a RAID 1 configuration for implementing data mirroring. In other configurations, the RAID storage array 112 may implement other RAID storage techniques, including striping, parity bits, and the like.

The storage control module 106 is also coupled with a second storage medium 116 (e.g., a HDD 118, or the like) for storing data in the second storage medium 116 at the instruction of the operating system. In embodiments, the second storage medium 116 may include a RAID storage array 120, such as an array including the first HDD 118 and a second HDD 122 (and possibly additional drives as well). The RAID storage array 120 may be arranged in a RAID 1 configuration, as previously described. In other configurations, the RAID storage array 120 may implement other RAID storage techniques, including striping, parity bits, and the like.

The second storage medium 116 has at least one performance, reliability, or security characteristic different from the first storage medium 108. For example, the first SSD 110/RAID storage array 112 may have a lower latency than the first HDD 118/RAID storage array 120 for more quickly serving data storage and/or retrieval requests from the application server 102. Alternatively, the first SSD 110/RAID storage array 112 may have a higher reliability than the first HDD 118/RAID storage array 120. Further, the first SSD 110/RAID storage array 112 may provide a greater amount of security than the first HDD 118/RAID storage array 120. For example, the first SSD 110/RAID storage array 112 may store data in a scrambled/encrypted format, or the like (while the first HDD 118/RAID storage array 120 may store data in an unencrypted format). It should be noted that while the first SSD 110, the second SSD 114, the RAID storage array 112, the first HDD 118, the second HDD 122, and the RAID storage array 120 have been described with some specificity, the first storage medium 108 and/or the second storage medium 116 may include other types of storage media coupled with the storage control module 106, including storage media having alternative physical and/or logical characteristics.

In embodiments, the storage control module 106 may include a disk array controller 124 for managing the first SSD 110/RAID storage array 112 and/or the first HDD 118/RAID storage array 120. Utilizing the disk array controller 124, the storage control module 106 may present the first SSD 110/RAID storage array 112 and/or the first HDD 118/RAID storage array 120 to the application server 102 as one or more logical units. Further, the disk array controller 124 may control the first SSD 110/RAID storage array 112 for transparently storing certain portions of data so that future requests for that data can be served faster.

In an example implementation illustrated in FIG. 1, a first portion of critical data utilized by the software application 104 (e.g., data blocks 2, 4, and 16) may be stored in the first storage medium 108. In embodiments, critical data is identified by the software application 104 and includes performance sensitive data (e.g., frequently accessed data) that would benefit from selective storage in higher performance media. A second portion of data (e.g., data blocks 1, 3, and 5 through 15) may be stored in the second storage medium 116. Alternatively, in an example implementation illustrated in FIG. 2, data blocks 2, 4, and 16 may be stored in the first storage medium 108 and data blocks 1 through 16 may be stored in the second storage medium 116.

In some implementations, a write to a critical data block can go to the first storage medium 108 first and then to the second storage medium 116 at a later time when system performance may be less impacted. In either case, the storage control module 106 may present the internal data blocks stored in the first storage medium 108 and/or the second storage medium 116 to the application server 102 as a logical construct, where an external view of the data blocks may include a logical arrangement of the data blocks as one contiguous memory space. However, this implementation is provided by way of example only and is not meant to be limiting of the present disclosure. Thus, other logical arrangements presenting different external views of the data may also be utilized.

In embodiments, the first/critical portion of data for the software application 104 (e.g., data blocks 2, 4, and 16) is identified by a first importance level assigned by the software application 104. Further, the second portion of data (e.g., data blocks 1, 3, and 5 through 15) is identified by a second importance level assigned by the software application 104 (in some embodiments, an assigned importance level may be defined as a lack of a specific identification by the software application 104). In one example implementation, the software application 104 assigns importance levels to data by identifying critical data according to the frequency of data accesses (e.g., utilizing a Least Recently Used (LRU) priority scheme or by identifying metadata that may be frequently accessed by the software application 104). In another example implementation, the software application 104 identifies data based on the latency of secondary storage (e.g., in a case where the second storage medium 116 includes various storage media with different access times).

In the example implementations illustrated in FIGS. 1 and 2, the lower latency of the first SSD 110/RAID storage array 112 may allow for faster access to data stored in the first storage medium 108. Thus, the first portion of data assigned the first importance level by the software application 104 may be more efficiently stored and/or retrieved by the operating system. In the example configuration illustrated in FIG. 1, the first portion of data may be stored and/or retrieved directly in the first SSD 110/RAID storage array 112. In the example configuration illustrated in FIG. 2, the first portion of data may first be pre-loaded from the first HDD 118/RAID storage array 120 into the first SSD 110/RAID storage array 112 prior to retrieval by the operating system.

In other implementations, the software application 104 may assign importance levels to data by identifying critical data according to its data type. For instance, in one specific embodiment, sequential data included with a video file may be identified as critical data when that data will be frequently accessed. In another implementation, sequential data may be excluded from the first/critical portion of data when that data will be infrequently accessed. In further implementations, the software application 104 may identify critical data according to how frequently that data may require modification. For example, in a case where the first storage medium includes Multi-Level Cell (MLC) flash memory (or another type of memory having high read speeds but a shorter life in the presence of writes), frequently accessed read intensive data which is infrequently modified may be identified as critical data, while frequently accessed data which is also frequently modified may be excluded from the first/critical portion of data.

In embodiments, data for the software application 104 stored in the first storage medium 108 and/or the second storage medium 116 may be loaded into a memory space of the information handling system 100 for utilization by the software application 104. For example, the operating system may store and/or retrieve data in the main memory of the information handling system 100 for the software application 104. Periodically, this data may then be stored and/or retrieved in secondary storage including the first storage medium 108 and/or the second storage medium 116.

In some embodiments, the memory space of the information handling system 100 may include a Dynamic Random Access Memory (DRAM) cache. The DRAM cache may further improve access times for data utilized by the software application 104. For example, the storage control module 106 may include a cache controller, which may be implemented as a circuit controlling an interface between the application server 102 and the DRAM cache. The cache controller may control the DRAM cache for transparently storing data so that future requests for that data can be served faster.

In some embodiments, the DRAM cache may be implemented as part of the main memory of the information handling system 100, while in other embodiments, the DRAM cache may be implemented as another type of cache memory. For example, the DRAM cache may be physically and/or logically separate from the main memory. It should be noted that while the DRAM cache has been described with some specificity, other types of cache memory may be coupled with the application server 102, including memory having alternative physical and/or logical characteristics.

It should be noted that in some embodiments, utilizing the first storage medium 108 as a cache instead of utilizing a mapping scheme for accelerating the critical data may allow the size of the cache in comparison to the amount of critical data to be flexible. For instance, if the available space in the first storage medium 108 is less than the space required for all of the critical data identified by the software application 104, the storage control module 106 may utilize a cache replacement algorithm (e.g., a Least Recently Used (LRU) algorithm) to keep the most important of the critical data available at higher performance levels. Alternatively, if the cache has more than enough space available for all of the critical data identified by the software application 104, the additional space may be utilized for improving the performance of some non-critical data (e.g., some of the second portion of data identified by the software application 104).

In some implementations, the information handling system 100 may be implemented as a personal device, such as a desktop computer, a laptop computer, a personal digital assistant, a mobile communications device (e.g., a cellular telephone), an internet tablet, or another type of stand alone device. In other implementations, the information handling system 100 may be implemented as a computer server and/or a terminal connected to a storage network, such as a Storage Area Network (SAN), or the like. In still further embodiments, the information handling system 100 may be implemented as a cloud computing arrangement utilizing multiple Internet terminals/stations, where one or more of the terminals/stations are coupled with network storage. It will be appreciated that the information handling system 100 may be implemented in many other various configurations as well.

Figure 4:
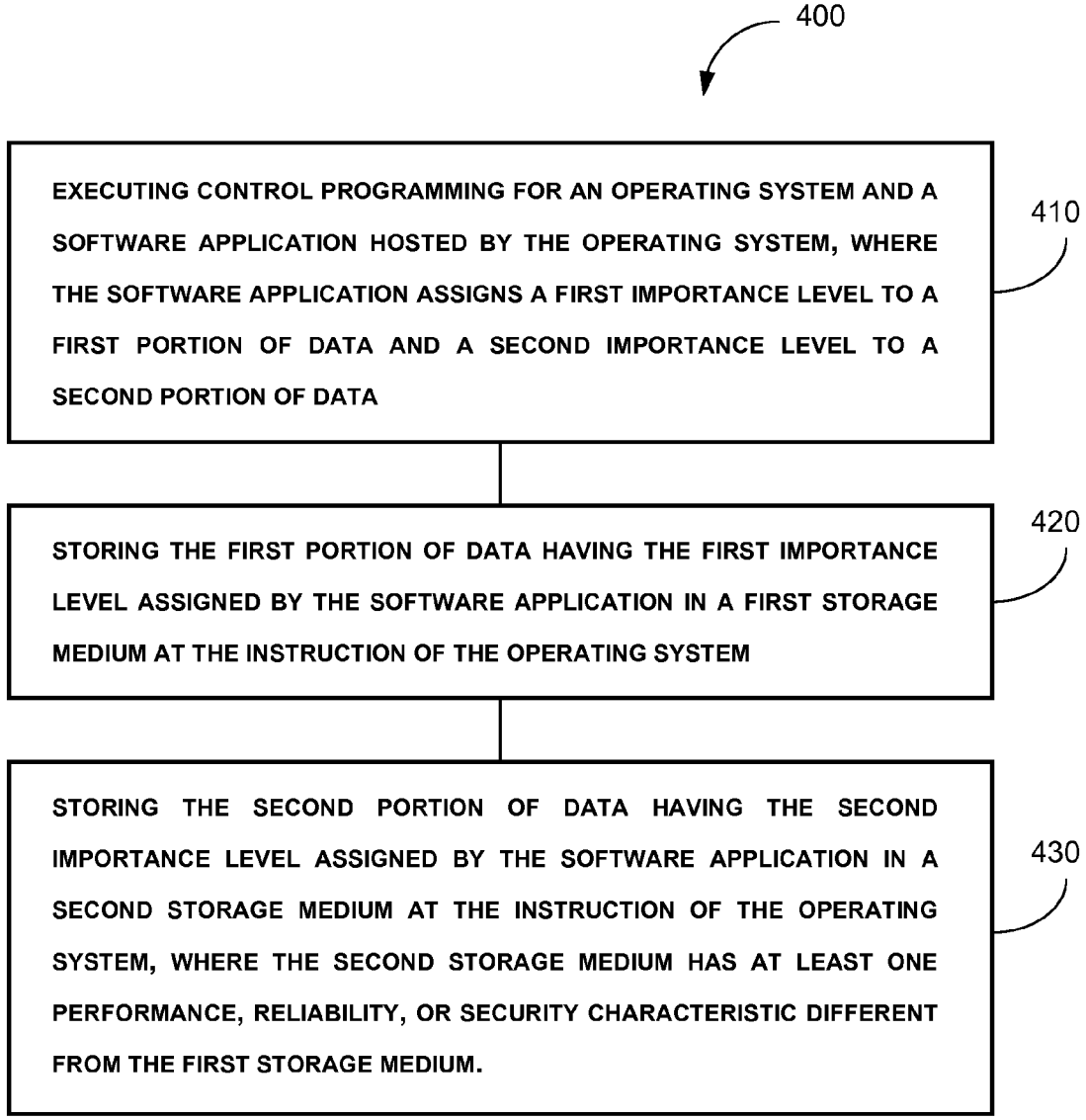
FIG. 4 is a flow diagram illustrating a method for selectively storing data identified by a software application in higher performance media.

FIG. 4 illustrates a method 400 for selectively storing data identified by a software application in higher performance media. The method may include executing control programming for an operating system and a software application hosted by the operating system. The software application assigns a first importance level to a first portion of data and a second importance level to a second portion of data, 410. Next, the method may include storing the first portion of data having the first importance level assigned by the software application in a first storage medium at the instruction of the operating system, 420. Then, the method may include storing the second portion of data having the second importance level assigned by the software application in a second storage medium at the instruction of the operating system, 430. The second storage medium has at least one performance, reliability, or security characteristic different from the first storage medium.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A device, comprising:
an application server configured for executing control programming for an operating system and a software application hosted by the operating system, where the software application assigns a first importance level to a first portion of data and a second importance level to a second portion of data;
a storage control module coupled with the application server for storing the first portion of data and the second portion of data at the instruction of the operating system;
a first storage medium comprising a redundant array of independent disks coupled with the storage control module for storing the first portion of data having the first importance level assigned by the software application; and
a second storage medium comprising a redundant array of independent disks coupled with the storage control module for storing the second portion of data having the second importance level assigned by the software application, where the second storage medium has a security characteristic different from the first storage medium.

2. The device of claim 1, wherein the first portion of data is stored in the second storage medium and pre-loaded from the second storage medium into the first storage medium.

3. The device of claim 1, wherein the first portion of data is not stored in the second storage medium.

4. The device of claim 1, wherein the first storage medium includes at least one of flash memory, a Peripheral Component Interconnect Express (PCIe) card, or a high performance Hard Disk Drive (HDD).

5. The device of claim 1, wherein the second storage medium includes a high capacity hard disk drive.

6. The device of claim 1, wherein the first portion of data is cycled out of the first storage medium utilizing a least recently used priority scheme.

7. The device of claim 1, wherein the first storage medium has a lower latency than the second storage medium.

8. A method, comprising:
executing control programming for an operating system and a software application hosted by the operating system, where the software application assigns a first importance level to a first portion of data and a second importance level to a second portion of data;
storing the first portion of data having the first importance level assigned by the software application in a first storage medium comprising a redundant array of independent disks at the instruction of the operating system; and
storing the second portion of data having the second importance level assigned by the software application in a second storage medium comprising a redundant array of independent disks at the instruction of the operating system, where the second storage medium has a security characteristic different from the first storage medium.

9. The method of claim 8, further comprising:
storing the first portion of data in the second storage medium; and
pre-loading the first portion of data from the second storage medium into the first storage medium.

10. The method of claim 8, wherein the first portion of data is not stored in the second storage medium.

11. The method of claim 8, wherein the first storage medium includes at least one of flash memory, a Peripheral Component Interconnect Express (PCIe) card, or a high performance Hard Disk Drive (HDD).

12. The method of claim 8, wherein the second storage medium includes a high capacity hard disk drive.

13. The method of claim 8, further comprising:
cycling the first portion of data is out of the first storage medium utilizing a least recently used priority scheme.

14. The method of claim 8, wherein the first storage medium has a lower latency than the second storage medium.

15. A system, comprising:
an application server configured for executing control programming for an operating system and a software application hosted by the operating system, where the software application assigns a first importance level to a first portion of data and a second importance level to a second portion of data; and
a storage network for coupling with the application server, the storage network including
a storage control module for storing the first portion of data and the second portion of data at the instruction of the operating system,
a first storage medium comprising a redundant array of independent disks coupled with the storage control module for storing the first portion of data having the first importance level assigned by the software application, and
a second storage comprising a redundant array of independent disks medium coupled with the storage control module for storing the second portion of data having the second importance level assigned by the software application, where the second storage medium has a security characteristic different from the first storage medium.

16. The system of claim 15, wherein the first portion of data is stored in the second storage medium and pre-loaded from the second storage medium into the first storage medium.

17. The system of claim 15, wherein the first portion of data is not stored in the second storage medium.

18. The system of claim 15, wherein the first storage medium includes at least one of flash memory, a Peripheral Component Interconnect Express (PCIe) card, or a high performance Hard Disk Drive (HDD).

19. The system of claim 15, wherein the second storage medium includes a high capacity hard disk drive.

20. The system of claim 15, wherein the first portion of data is cycled out of the first storage medium utilizing a least recently used priority scheme.

\* \* \* \* \*